Figure 3:
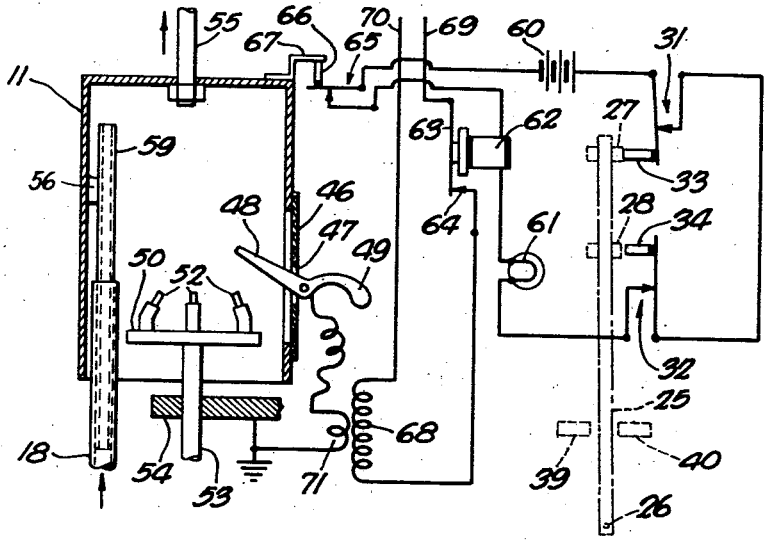

April 3, 1945.   F. MARTINDELL   2,373,041
FLUID FLOW RESPONSIVE DEVICE
Filed Nov. 7, 1942   2 Sheets-Sheet 1
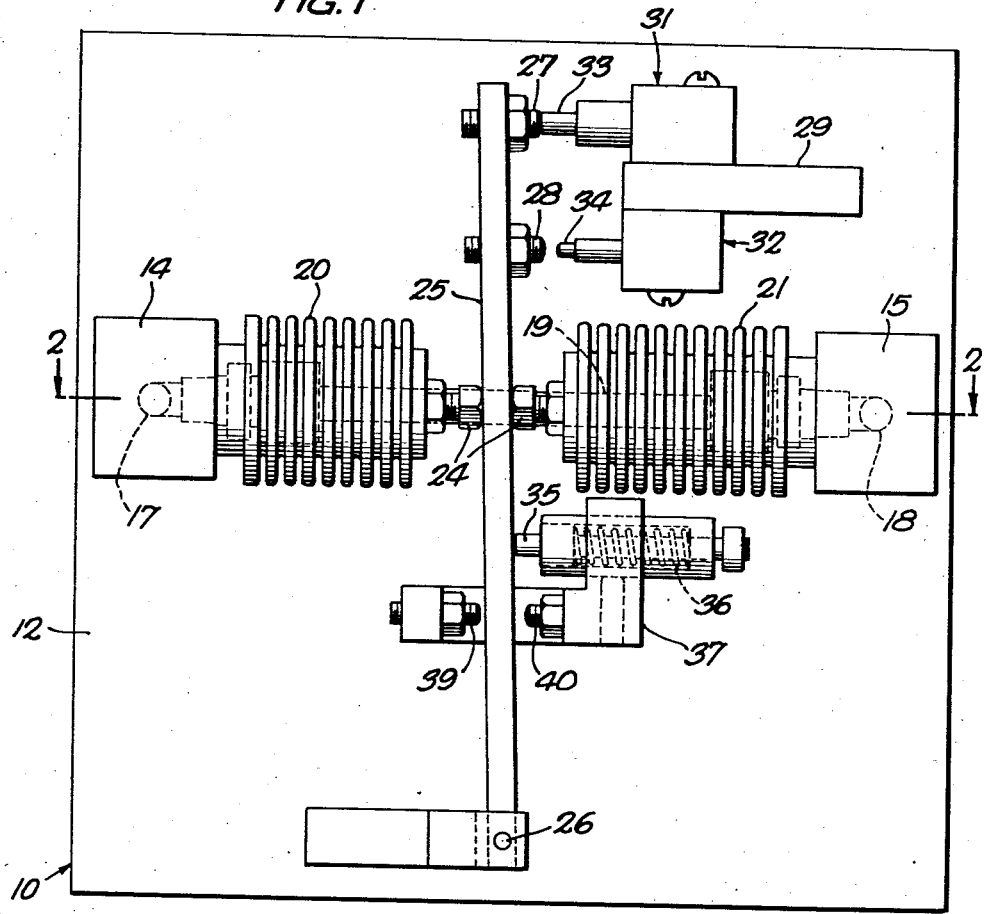
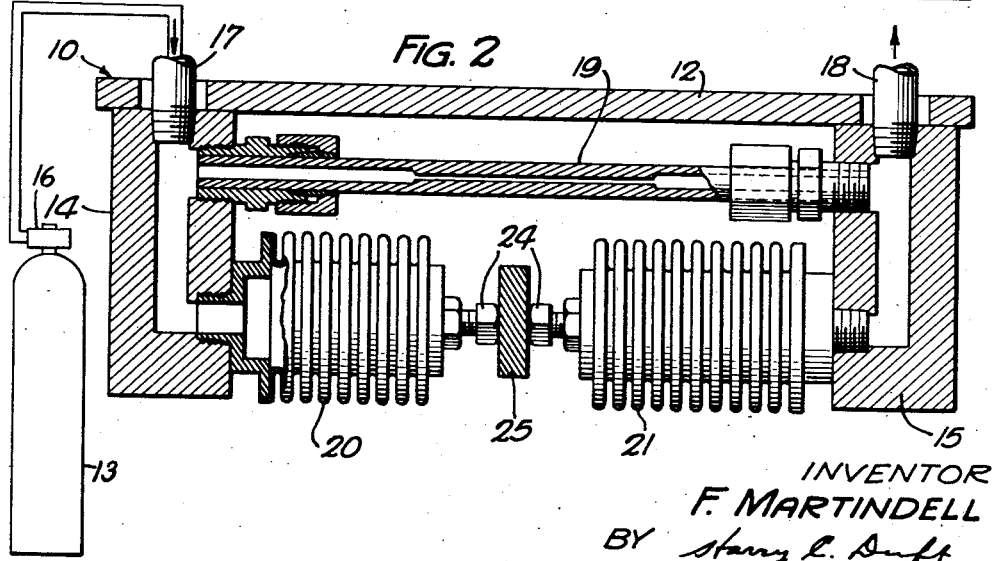
INVENTOR
F. MARTINDELL
BY
ATTORNEY INVENTOR
F. MARTINDELL
BY [signature]
ATTORNEY Patented Apr. 3, 1945

2,373,041

UNITED STATES PATENT OFFICE 2,373,041

FLUID FLOW RESPONSIVE DEVICE

Frank Martindell, Western Springs, Ill., assignor to Western Electric Company, Incorporated, New York, N. Y., a corporation of New York Application November 7, 1942, Serial No. 464,900

5 Claims. (Cl. 177—311)

This invention relates to fluid flow responsive devices and particularly to a combined fluid flow indicator and electric circuit controlling device.

The invention is particularly applicable to arc welding operations in a hydrogen atmosphere under a welding hood. In such welding operations, the flow of hydrogen into the hood, at times, may stop, due to either failure of the source of supply or clogging in the conduit connecting the source to the hood. In such cases, it is desirable that a signal be automatically given to the operator and the welding circuit opened so that the difficulty may be remedied. It is also desirable, after the hydrogen begins to flow into the hood again, since it takes some time before the hood is filled with hydrogen and void of air, to prevent the welding circuit from being completed, for safety purposes, until the hydrogen has flowed into the hood for a predetermined time.

An object of the invention is to provide a practical and reliable combined fluid flow indicator and/or electric circuit controlling device.

In accordance with one embodiment of the invention as applied to arc welding operations under a reciprocatory hood in a hydrogen atmosphere, there is provided a device operating from the pressure differential in a hydrogen supply conduit, which includes a capillary tube, or other suitable member having a restricted orifice, connected to the welding hood, and an electric signal and safety control circuit, which is responsive to a normal flow of the hydrogen as well as a stoppage of flow thereof either at the inlet or outlet sides of the device, due to either failure of the supply source or clogging of the outlet, or within the capillary tube, to give a signal to the operator. Combined with such pressure differential responsive device and included in the circuit is an electric circuit controlling device for the welding circuit, which comprises a time delay or retarded relay which is de-energized upon stoppage of the flow of hydrogen into the hood and thus the welding circuit is opened and held open until the hydrogen has flowed into the hood for a predetermined time to remove the air therefrom, after which it is closed. Means is also included in the indicator and control circuit which is operable in response to reciprocatory movements of the hood to control the welding circuit.

Figure 4:
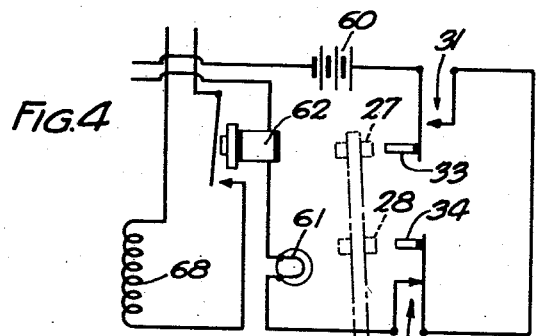
Figure 5:
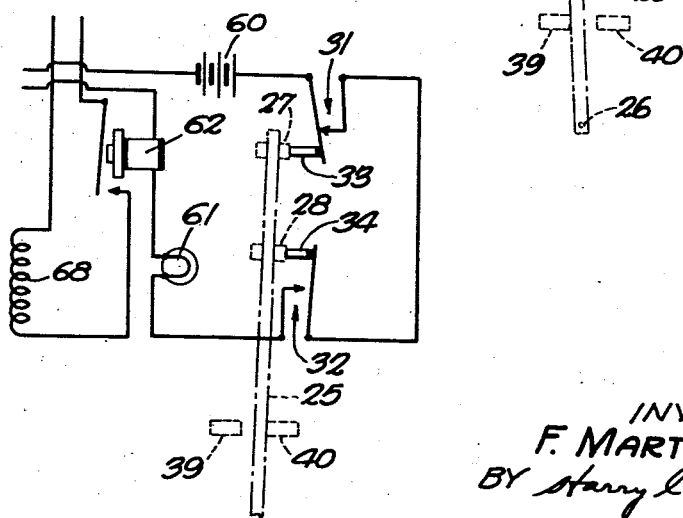

Other objects and advantages of this invention will more clearly appear from the following detailed description, taken in connection with the accompanying drawings, in which Fig. 1 is a front elevation of a hydrogen flow actuated device, embodying the features of the invention shown, connected to a hydrogen supply conduit for supplying a hood of an arc welding apparatus with hydrogen;

Fig. 2 is a plan section, partly in elevation, taken on the line 2—2 of Fig. 1;

Fig. 3 is a diagrammatic view of portions of the combined hydrogen flow indicator and electric circuit controlling device for indicating hydrogen flow conditions from the supply source through the device and into the hood and for preventing completion of the welding circuit until the hydrogen has flowed into the hood for a predetermined time, the circuit being shown operated in response to a normal hydrogen flow condition; and Figs. 4 and 5 are fragmentary views of Fig. 3 showing the device and circuit operated in response to a stoppage of hydrogen flow to the hood and a clogging in the capillary tube, respectively.

Referring to the drawings in detail and particularly to Figs. 1 and 2, a fluid flow actuated device, indicated, in general, at 10 (Fig. 1) is provided for use in connection with arc welding performed under a hydrogen atmosphere, or other inert gaseous mediums, in a bell or hood indicated at 11 (Fig. 3). The device 10 comprises a base 12, which is attached to a standard or frame (not shown) and fixed to the base are two spaced and aligned cored members 14 and 15, to which are connected hydrogen inlet and outlet conduits 17 and 18, respectively. The inlet conduit 17 is connected to a suitable constant supply source, shown schematically at 13 (Fig. 2). for hydrogen under, for example, approximately four pound pressure, a pressure regulating valve being indicated at 16. The outlet conduit 18 directs the hydrogen passing through the device into the hood 11, the hydrogen flowing into the hood under a very slight pressure. The cored members 14 and 15 are in communication with each other by means of an interconnecting capillary tube 19 or other suitable member having a restricted orifice. Rigidly supported on and in communication with the interior of the cored member 14 is a bellows 20, which is responsive to four pounds pressure per square inch, and similarly supported and in communication with the interior of the cored member 15 is a bellows 21, which is responsive to one pound per square inch of pressure, the two bellows being in axial alignment. The opposed free inner sealed ends of the bellows 20 and 21 each carry an adjustable headed screw 24 which constantly engage opposite sides of a vertical arm 25 pivoted at its lower end at 26 to the base 12. Adjustably mounted in the upper end of the pivotal arm 25 are adjustable switch actuating screws 27 and 28. Attached to the base 12 above the capillary tube 19 and bellows 20 and 21 is a bracket 29, upon opposite sides of which are secured normally open and closed micro-switches 31 and 32 of a standard commercial type, having operating plungers 33 and 34, respectively, the switch actuating screws 27 and 28 being aligned with the plungers. The arm 25 is maintained in a normal initial position when no hydrogen is flowing through the device through the action of a spring pressed plunger 35 constantly engaging the arm, the plunger being carried by an adjustable housing 36 carried on a bracket 37 fixed to the base 12. Adjustably carried by the bracket 37, below the plunger 35, are two adjustable stop screws 39 and 40, one at each side of the pivotal arm 25, for limiting its movement in either direction about its pivot 26. In the normal initial position of the arm 25, it engages the stop screw 39, at which time the switches 31 and 32 are in their normal open and closed positions, respectively.

In the use of the fluid flow indicator device 10, above described, the compressed hydrogen flows into the device through the inlet conduit 17 and thence through the member 14, capillary tube 19, member 15 and outlet conduit 18 to the interior of the welding bell or hood 11 (Fig. 3). The inlet and outlet pressures in the cored members 14 and 15 and capillary tube 19 are also impressed upon the bellows 20 and 21, respectively. The device 10 operates on the pressure differential between the inlet and outlet ends of the capillary tube 19 and when the normal desired flow of hydrogen through the device and into the bell or hood 11 is being maintained, the arm 25, receiving motion from the pressure responsive bellows 20, will move clockwise about its pivot 26 (Fig. 1) against the action of the spring pressed plunger 35 and assumes such a position that the switch actuating screw 27, carried by the arm 25, will operate the normally open switch 31 through its operating plunger 33 to its closed position, as shown in Fig. 1 and in diagrammatic view Fig. 3, such position of the arm 25 not affecting the normally closed switch 32. The operation of the combined indicating and safety control circuit (Figs. 3, 4 and 5), which includes the switches 31 and 32, will be described presently.

In the case of complete stoppage of the hydrogen flow through the outlet conduit 18 of the device 10, following the capillary tube 19, due to clogging therein or a failure of the supply source, the pressures in both of the bellows 20 and 21 will be equalized, thus permitting the arm 25 to move counter-clockwise, through the action of the spring pressed plunger 35, and assume such a position that it will engage the stop screw 39. In response to this latter movement of the arm 25, the switch 31 is permitted to return to its normally open position. If the device 10 should become clogged in the capillary tube 19, the pressure on the bellows 20 will be so great that the arm 25 will be moved clockwise against the action of the spring pressed plunger 35, sufficiently not only to close the normally open switch 31, but to open the normally closed switch 32, which condition is illustrated diagrammatically in Fig. 5, this latter movement of the arm 25 being limited by its engagement with the stop screw 40.

Referring to the diagrammatic views, Figs. 3, 4, and 5, and particularly to Fig. 3, wherein is illustrated the hood or bell 11 in which arc welding is performed in a hydrogen atmosphere, the hood 11 is provided with a window 46 of suitable transparent material and has an opening 47 whereby an operator may insert and manually manipulate an electrode 48 having a handle 49. Disposed below the electrode 48 in the hood 11 is an electrode 50, which is shown in the form of a turntable upon which a plurality of work piece assemblages 52 to be arc welded are suitably held. A depending shaft 53 attached to the electrode turntable 50 is journalled in a supporting frame 54 of the welding apparatus. Attached to the closed upper end wall of the hood 11 is a shaft 55, which is reciprocated by suitable means (not shown) for the purpose of elevating and lowering the hood 11. After each welding operation, the turntable electrode 50 is rotated, by suitable actuating means (not shown) connected to the shaft 53, to position another assemblage of work pieces 52 in position for welding. After the plurality of assemblages of work pieces 52 carried on the turntable electrode 50 are welded, the hood 11 is elevated sufficiently to permit the removal of the welded work pieces 52 and to reload the turntable. Thereafter, the hood 11 is lowered and the welding operations are repeated. The purpose of providing a turntable electrode 50 and supporting a plurality of work piece assemblages thereon is to perform the welding operation in a hydrogen atmosphere in an economical and practicable manner. In order to economize in the use of the hydrogen which is constantly flowing into the hood 11, it is desirable that the operations of raising and lowering the hood be held to a minimum since each time the table is raised, hydrogen is wasted and further each time the hood is raised and lowered, it is necessary that the hydrogen should flow thereinto for a predetermined time in order to fill it and remove the air therefrom in order that the welding operations may safely follow. To further this economy in the use of the hydrogen, which is constantly flowing during normal operations into the hood 11 by means of the conduit 18 connected to the outlet end of the hydrogen flow actuated device 10, the following arrangement is provided. The hood 11 has attached to its inner wall, as indicated at 56, a conduit 59, which is telescopically entered in the bore of the conduit 18. The upper end of the conduit 59 is open, or it may be closed, and its wall apertured, to permit the flow of hydrogen therefrom into the hood. Thus, in any position of the hood 11, the hydrogen will flow thereinto at a fixed plane adjacent its upper closed end.

The combined indicating and safety control circuit (Fig. 3) which includes the micro-switches 31 and 32, connected in series in the circuit, also includes a battery 60, or other source of electric energy, an electric lamp 61, or other signal device, and a retarded relay 62, which, upon energization, is slow to operate its armature 63, which is shown as engaging a circuit closing contact 64, all suitably connected in the circuit. Also included in this circuit is a third normally open micro-switch 65 similar to the switch 31, having an operating plunger 66 lying in the path of a switch actuating member 67 carried by the reciprocatory hood 11, the member 67 closing the switch 65 in the final period of movement of the hood to its lowered position. In Fig. 3, the combined indicating and control circuit have been completed by the closing of the normally open micro-switches 31 and 65, in the manner hereinbefore described, it being assumed that a normal flow of hydrogen is passing through the device 10 and the conduit 18 into the welding hood 11. Thus, the lamp 61 is lighted, indicating the hydrogen flow is normal, and the armature 63 of the retarded relay 62 has been operated upon lapse of a predetermined period of time sufficient to insure that the welding hood 11 is filled with hydrogen and void of air. As shown, the operated relay armature 63 has engaged the contact 64 and thus has closed the primary of the welding circuit, indicated at 68, which is supplied from a suitable electric energy source connected to main conductors 69 and 70. The welding circuit through a secondary 71 of the welding circuit, which includes the electrodes 48 and 49, is thus completed and the operator may manipulate the electrode 48 to weld the assemblages of piece parts 52 in the manner previously described.

Although a specific embodiment of the invention has been described hereinbefore as applied to an arc welding apparatus, wherein hydrogen is used, it is clear that it may have a more general application and other inert gaseous mediums may be used and that modifications can be made.

What is claimed is:

1. In a fluid flow indicator device, a pair of fluid pressure actuated bellows, a member having a constant restricted orifice communicating at opposite ends with said bellows, fluid inlet and outlet conduits communicating with said bellows and member, a movable arm operatively associated with both of said bellows for actuation by differential pressure on said bellows, an electric circuit adapted to be energized by a predetermined movement of said arm, and means responsive to a greater or lesser movement of said arm resulting in the de-energization of said circuit.

2. In a combined fluid flow indicator and electric circuit controlling device, an electric circuit to be controlled, an electric signal and control circuit, a movable arm for controlling said circuit, fluid flow responsive means for actuating said arm, a member having a restricted orifice communicating at opposite ends with said means, fluid inlet and outlet conduits communicating with said means and member, means in said signal and control circuit and operable by a predetermined movement of said arm to energize said circuit, a greater or less movement of said member resulting in the de-energization of said signal and control circuit, means in said circuit for indicating fluid flow conditions between said inlet and outlet conduits, and a time delay relay in said circuit effective to energize the circuit to be controlled after said circuit has been energized for a predetermined period of time.

3. In a fluid flow indicator device, an electric signal circuit, normally open and closed switches in said circuit, a movable member for operating said switches, fluid flow responsive means for actuating said member, a capillary tube communicating at opposite ends with said means, and fluid inlet and outlet conduits communicating with said means and capillary tube, a normal fluid flow through said device causing a predetermined movement of said member effective to close said normally open switch to energize said signal circuit, a greater movement of said member from said predetermined movement thereof being effective to open said normally closed switch and a movement thereof less than said predetermined movement effective to open said normally open switch, said greater and lesser movements of said member resulting in the de-energization of said signal circuit to indicate clogging and stoppage of flow respectively through the device.

4. In a fluid flow device, an electric circuit to be controlled, a normally open switch in said circuit, a normally closed switch in said circuit, a source of constant fluid pressure to provide a fluid flow, means responsive to the rate of fluid flow, an arm operable by said means for actuating said switches, a predetermined movement of said arm closing said normally open switch, and a greater movement of said arm opening said normally closed switch.

5. The combination with an apparatus which includes a hood in which work is performed in a hydrogen atmosphere, of a combined hydrogen flow indicator device communicating with the hood and a circuit controller, said device comprising electric signal and control circuits connected in series, a movable arm for controlling said circuits, means including a pair of differentially expansible bellows operatively engaged with said arm for moving the same, a capillary tube communicating at opposite ends with said bellows, fluid inlet and outlet conduits communicating with said bellows and capillary tube, said outlet conduit communicating with the interior of the hood, means in said signal circuit and operable by a predetermined movement of said arm to energize said signal circuit, a greater or lesser movement of said arm resulting in the de-energization of said signal and control circuits, means in said signal circuit for indicating hydrogen flow conditions between said device and the interior of the hood, and a time delay relay in said signal circuit effective to energize said control circuit after said signal circuit has been energized for a predetermined period of time.

FRANK MARTINDELL.